US009331775B2

(12) United States Patent
Picard et al.

(10) Patent No.: US 9,331,775 B2
(45) Date of Patent: May 3, 2016

(54) METHOD AND SYSTEM FOR DETECTING BROADCAST SIGNALS TRANSMITTED BY TERRESTRIAL SOURCES AND RECEIVED BY A SATELLITE

(71) Applicant: ASTRIUM SAS, Suresnes (FR)

(72) Inventors: Mathieu Picard, Toulouse (FR); Alexandre Mege, Bourg la Reine (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 247 days.

(21) Appl. No.: 14/060,776

(22) Filed: Oct. 23, 2013

(65) Prior Publication Data

US 2014/0113546 A1   Apr. 24, 2014

(30) Foreign Application Priority Data

Oct. 23, 2012   (FR) ...................................... 12 02823

(51) Int. Cl.
H04B 7/185   (2006.01)

(52) U.S. Cl.
CPC ........ H04B 7/18523 (2013.01); H04B 7/18517 (2013.01)

(58) Field of Classification Search
USPC ................ 455/3.01, 3.02, 3.05, 404.1, 404.2, 455/422.1, 427, 431, 12.1, 13.2, 25, 67.11, 455/67.13; 342/89, 90, 350, 352, 354, 358, 342/360, 385, 386
See application file for complete search history.

(56) References Cited

U.S. PATENT DOCUMENTS

| | | | | |
|---|---|---|---|---|
| 6,124,832 A * | 9/2000 | Jeon | ..................... | H01Q 1/3275 342/375 |
| 6,151,513 A * | 11/2000 | Petry | ..................... | H01Q 25/00 342/373 |
| 7,414,567 B2 * | 8/2008 | Zhang | ..................... | G01S 7/006 342/133 |
| 7,809,370 B2 * | 10/2010 | Stolte | ................. | H04B 7/18513 455/427 |
| 7,876,865 B2 * | 1/2011 | Peach | ................ | H04B 7/18513 375/150 |

(Continued)

FOREIGN PATENT DOCUMENTS

| | | |
|---|---|---|
| EP | 2 302 821 | 3/2011 |
| EP | 2 315 366 | 4/2011 |

(Continued)

OTHER PUBLICATIONS

International Search Report dated Aug. 22, 2013, corresponding to the French Application No. 12 02823.

*Primary Examiner* — Tuan A Tran
(74) *Attorney, Agent, or Firm* — Young & Thompson

(57) ABSTRACT

A method (50) for detecting broadcast signals, transmitted by terrestrial sources (40) and received by a satellite (20), in individual signals obtained respectively from different individual antennas (24) of an antenna array (22) of the satellite, includes a first detection iteration (51*a*) and a second detection iteration (51*b*), each of the first and second detection iterations including a step (52) of forming, from the individual signals, virtual beams of different respective main radiation directions, and a step of searching for the presence of broadcast signals in the virtual beams. Furthermore, for at least one broadcast signal detected during the first detection iteration, the respective contributions of the at least one detected broadcast signal to the different individual signals are attenuated, relative to the first detection iteration, for all or part of the virtual beams formed during the second detection iteration. A system (10) for detecting broadcast signals is also described.

15 Claims, 2 Drawing Sheets

(56) References Cited

U.S. PATENT DOCUMENTS

| | | | |
|---|---|---|---|
| 8,373,591 B2* | 2/2013 | Margolin | G01S 5/12 342/146 |
| 8,498,803 B2 | 7/2013 | Blomenhofer et al. | |
| 8,643,534 B2* | 2/2014 | Margolin | G01S 5/12 342/146 |
| 8,780,788 B2* | 7/2014 | Peach | G01S 1/68 370/319 |
| 9,008,233 B2* | 4/2015 | Burzigotti | H04B 7/18515 375/324 |
| 9,015,567 B2* | 4/2015 | Peach | H04B 7/18513 714/799 |
| 9,081,077 B2* | 7/2015 | Laine | G01S 5/0027 |
| 2011/0304502 A1* | 12/2011 | Chen | H04B 7/1851 342/352 |
| 2012/0017247 A1* | 1/2012 | Hodson | H04B 7/18523 725/67 |
| 2013/0002476 A1* | 1/2013 | Laine | G01S 5/0027 342/353 |
| 2013/0058271 A1* | 3/2013 | De Latour | H04B 7/18508 370/315 |

FOREIGN PATENT DOCUMENTS

| | | |
|---|---|---|
| EP | 2 362 555 | 8/2011 |
| EP | 2263225 | 9/2011 |
| WO | 2007143478 | 12/2007 |
| WO | 2008/148188 | 12/2008 |

* cited by examiner

METHOD AND SYSTEM FOR DETECTING BROADCAST SIGNALS TRANSMITTED BY TERRESTRIAL SOURCES AND RECEIVED BY A SATELLITE

TECHNICAL FIELD

The present invention relates to a method and a system for detecting broadcast signals transmitted by terrestrial sources, in individual signals obtained respectively from different individual antennas of an antenna array.

The present invention is applicable, in a particularly advantageous although nonlimiting manner, to the detection of AIS (Automatic Identification System) signals transmitted by ships and/or the detection of ADS-B (Automatic Dependent Surveillance-Broadcast) signals transmitted by aircraft and received by an antenna array of a satellite in earth orbit.

STATE OF THE ART

These days, most ships and aircraft broadcast their position, self-determined for example by means of GPS receivers, via signals, respectively AIS and ADS-B signals.

Such AIS and ADS-B signals can be received by, respectively, nearby ships and aircraft, to avoid collisions with said nearby ships and aircraft, and by ground stations to manage the respectively maritime and air traffic.

There are also plans to equip satellites in earth orbit with means adapted to receive AIS and/or ADS-B signals in order to make it possible to collect said AIS and/or ADS-B signals in geographic areas that cannot be covered, or can be covered only with difficulty, by ground stations (see for example the document WO 2007/143478 for the AIS signals, and the document EP 2263225 for the ADS-B signals).

However, such satellites then cover much wider geographic areas than the conventional ground stations, such that the number of ships and/or aircraft for which the AIS and/or ADS-B signals are likely to be received simultaneously is much greater for such a satellite than for a conventional ground station.

Thus, numerous collisions of AIS and/or ADS-B signals are likely to occur on a satellite, particularly if the geographic area observed is dense, such that numerous AIS and/or ADS-B signals will not be detected.

In order to detect AIS signals received simultaneously by a satellite in travelling orbit, it is known practice to exploit the Doppler effect. In practice, because of the relative movement of the satellite, the AIS signals received can be received with frequency offsets induced by Doppler effect, offsets which will sometimes be positive and sometimes be negative depending on whether the satellite is moving closer to or away from the ships having transmitted these AIS signals. A suitable frequency filtering therefore makes it possible, in some cases, to differentiate AIS signals received simultaneously.

In the case of ADS-B signals, the Doppler effect is, however, negligible and does not make it possible to differentiate ADS-B signals received simultaneously.

It is also known practice, in the field of space applications, to use antenna arrays comprising a plurality of individual antennas, and to form beams of different respective main directions of radiation. Thus, the geographic areas covered by each of the beams are less widespread, which tends to limit the collisions between signals received simultaneously. However, the number of collisions remains significant in the case of AIS and/or ADS-B signals, in particular in dense observed geographic areas.

SUMMARY OF THE INVENTION

The aim of the present invention is to remedy all or part of the limitations of the prior art solutions, notably those explained above, by proposing a solution which makes it possible to improve the detection of broadcast signals, in particular of AIS and/or ADS-B signals, even when numerous broadcast signals are received simultaneously.

To this end, and according to a first aspect, the invention relates to a method for detecting broadcast signals, transmitted by terrestrial sources and received by a satellite, in individual signals obtained respectively from different individual antennas of an antenna array of the satellite. The detection method comprises a first detection iteration and a second detection iteration, each of said first and second detection iterations comprising a step of forming, from the individual signals, virtual beams of different respective main directions of radiation, and a step of searching for the presence of broadcast signals in the virtual beams. Furthermore, for at least one broadcast signal detected during the first detection iteration, the respective contributions of said at least one detected broadcast signal to the different individual signals are attenuated, relative to said first detection iteration, for all or part of the virtual beams formed during the second detection iteration.

The detection method is based on the forming of virtual beams of different respective main directions of radiation.

The term "virtual beams" should be understood to mean that said beams are formed in a deferred manner (unlike beam forming in real time). The individual signals are consequently first of all stored, and can then be used to compute as many virtual beams as necessary.

The forming of a virtual beam makes it possible to attenuate the broadcast signals, received in directions of radiation that are different from the main direction of radiation of said virtual beam, relative to the broadcast signals received in said main direction of radiation. Thus, the interferences caused by the broadcast signals, received in directions of radiation different from the main direction of radiation of a virtual beam, are reduced, and the detection of the broadcast signals received in said main direction of radiation of said virtual beam is facilitated.

The detection method is also based on the attenuation, preferably for all the virtual beams formed during the second detection iteration, of the respective contributions of at least one broadcast signal, previously detected, to the different individual signals.

Thus, the interferences caused by all or part of the broadcast signals detected during the first detection iteration are reduced for the virtual beams formed during the second detection iteration, such that the detection of other broadcast signals, present in the individual signals and previously masked, will be facilitated.

In particular embodiments, the detection method comprises one or more of the following features, considered alone or in all technically possible combinations.

In a particular embodiment, the first detection iteration comprises, for each broadcast signal detected in the virtual beams, steps of:
  estimating the respective contributions of said detected broadcast signal to the different individual signals,
  suppressing the respective contributions of said broadcast signal detected in the different individual signals, and, during the second detection iteration, at least one virtual beam is formed from the individual signals obtained after suppression of the contributions of the broadcast signals detected during the first detection iteration.

Because the contributions of each detected broadcast signal are estimated and suppressed directly in the individual signals obtained from the individual antennas, the virtual beams formed subsequently during the second detection iteration will benefit from a reduction of interferences, even if they are of different main directions of radiation from those of the virtual beams formed during the first detection iteration. Thus, the detection method will be able to benefit from a wide diversity of virtual beams formed, while benefiting from a reduction of the interferences in the new virtual beams formed, in as much as the broadcast signals have been detected in virtual beams previously formed.

In a particular embodiment, the step of estimating the respective contributions of a detected broadcast signal to the different individual signals comprises steps of:
estimating a demodulated signal from said detected broadcast signal,
estimating a direction of arrival and an amplitude of arrival, on the antenna array, of said detected broadcast signal,
computing the respective contributions of said detected broadcast signal to the different individual signals, as a function of the demodulated signal, of the direction of arrival and of the amplitude of arrival of said detected broadcast signal.

In a particular embodiment, the detection method comprises, for each detected broadcast signal, the estimation also of the linear polarization of arrival of said detected broadcast signal on the antenna array, the respective contributions of the detected broadcast signal to the different individual signals being also computed as a function of said linear polarization of arrival.

In a particular embodiment, when a broadcast signal has been detected, a virtual beam is formed in the direction of arrival and/or the linear polarization of arrival of said detected broadcast signal to estimate the demodulated signal. Such provisions make it possible to improve the estimation of the demodulated signal, and consequently improve the estimation of the respective contributions of said detected broadcast signal.

In a particular embodiment, the detection method comprises, for each detected broadcast signal, the estimation also of a frequency of arrival and/or of an instant of arrival of said detected broadcast signal on the antenna array, the respective contributions of said detected broadcast signal to the different individual signals being also computed as a function of the frequency of arrival and/or of the instant of arrival.

In a particular embodiment, during the second detection iteration, the virtual beams formed are predefined virtual beams of different main directions of radiation from the main directions of radiation of the virtual beams formed during the first detection iteration.

In a particular embodiment, during the second detection iteration, the virtual beams formed are predefined virtual beams of different linear polarizations from the linear polarizations of the virtual beams formed during the first detection iteration.

In a particular embodiment, the virtual beams formed during the second detection iteration are adaptive virtual beams determined as a function of the broadcast signals detected during the first detection iteration.

In a particular embodiment, the adaptive virtual beams formed during the second detection iteration are orthogonal to the respective main directions of radiation and/or to the respective linear polarizations of at least a part of the virtual beams, formed during the first detection iteration, in which detection signals have been detected.

In a particular embodiment, the first detection iteration comprises, for each broadcast signal detected in the virtual beams, a step of estimating a direction of arrival and/or a linear polarization of arrival, on the antenna array, of said detected broadcast signal, and the adaptive virtual beams formed during the second detection iteration are orthogonal to the respective directions of arrival and/or orthogonal to the respective linear polarizations of arrival of at least a part of the broadcast signals detected during the first detection iteration.

In a particular embodiment, the broadcast signals are AIS signals transmitted by ships and/or ADS-B signals transmitted by aircraft.

In a particular embodiment, the direction of arrival of a detected broadcast signal is estimated as a function of information, included in said broadcast signal, relating to the position of the terrestrial source having transmitted said detected broadcast signal.

In a particular embodiment, during the at least two detection iterations, virtual beams of different respective linear polarizations are formed.

According to a second aspect, the invention relates to a computer program product comprising a set of program code instructions which, when executed by a processor, implement a detection method conforming to the invention.

According to a third aspect, the invention relates to a processing device comprising means adapted to implement a detection method conforming to the invention.

According to a fourth aspect, the invention relates to a system for detecting broadcast signals transmitted by terrestrial sources comprising at least one satellite in earth orbit and at least one terrestrial processing device conforming to the invention. Furthermore, the satellite comprises an antenna array comprising a plurality of individual antennas, means adapted to transmit all or part of the individual signals, obtained respectively from the different individual antennas, to the processing device. The processing device comprises means adapted to receive said individual signals transmitted by the satellite.

DESCRIPTION OF THE FIGURES

The invention will be better understood on reading the following description, given as a nonlimiting example, and with reference to the figures which represent.

In these figures, references that are the same from one figure to another designate identical or similar elements. For reasons of clarity, the elements represented are not to scale, unless otherwise stipulated.

DETAILED DESCRIPTION OF EMBODIMENTS

Figure 1:
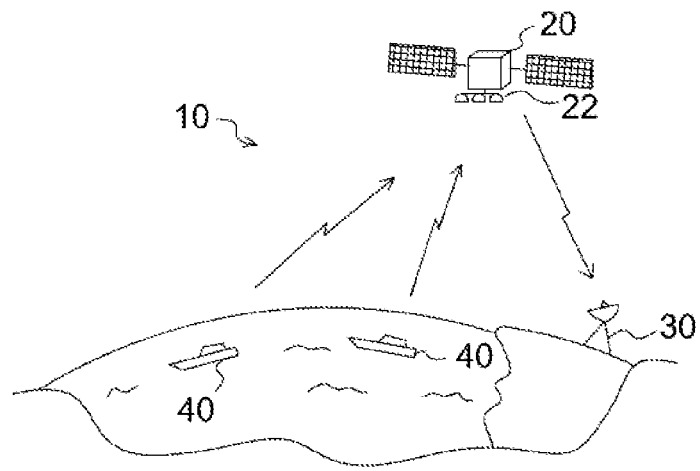
FIG. 1: a schematic representation of an exemplary embodiment of a system for detecting broadcast signals.

FIG. 1 schematically represents a system 10 for detecting broadcast signals transmitted by terrestrial sources 40.

The following description will be based on the nonlimiting case in which the terrestrial sources 40 are ships, and in which the broadcast signals transmitted by said ships are AIS signals.

Nothing precludes, according to other examples, from considering other types of terrestrial sources and broadcast signals, for example ADS-B signals transmitted by aircraft. Advantageously, the detection system 10 can be implemented to detect several types of broadcast signals, for example both AIS signals and ADS-B signals.

The detection system 10 comprises a satellite 20 in earth orbit. It should be noted that any suitable orbit can be considered, for example a low earth orbit LEO, a medium earth orbit MEO, etc.

The detection system 10 illustrated by FIG. 1 comprises a single satellite 20. Nothing precludes, according to other examples, from having a detection system 10 comprising a plurality of such satellites 20 in earth orbit.

The satellite 20 comprises an antenna array 22 comprising a plurality of individual antennas 24 adapted to receive the AIS signals transmitted by the ships 40. Hereinafter in the description, M will be used to designate the number of individual antennas 24.

In practice, several AIS signals are likely to be received simultaneously by the different individual antennas 24 of the antenna array 22. Thus, each individual antenna 24 of the antenna array 22 supplies an individual signal which can prove to be a composite signal combining, inter alia, several AIS signals transmitted by different ships 40 and received during one and the same acquisition interval.

The satellite 20 also comprises conventional means adapted to transmit all or part of the individual signals, obtained respectively from the different individual antennas 24, to a terrestrial processing device 30, which comprises conventional means adapted to receive said individual signals transmitted by the satellite 20.

The processing device 30 comprises means configured to detect the AIS signals in the individual signals received from the satellite 20, obtained respectively from the different individual antennas 24, in accordance with a detection method 50 described in more detail hereinbelow.

The processing device 30 to this end comprises a unit for processing the individual signals which for example takes the form of a processor and an electronic memory in which is stored a computer program product, in the form of a set of program code instructions which, when executed by the processor, implement all or part of the steps of the method 50 for detecting AIS signals. In a variant, the processing unit comprises programmable logic circuits, of FPGA, PLD, etc. type, and/or custom integrated circuits (ASIC), adapted to implement all or part of the steps of said method 50 for detecting AIS signals.

Figure 2:
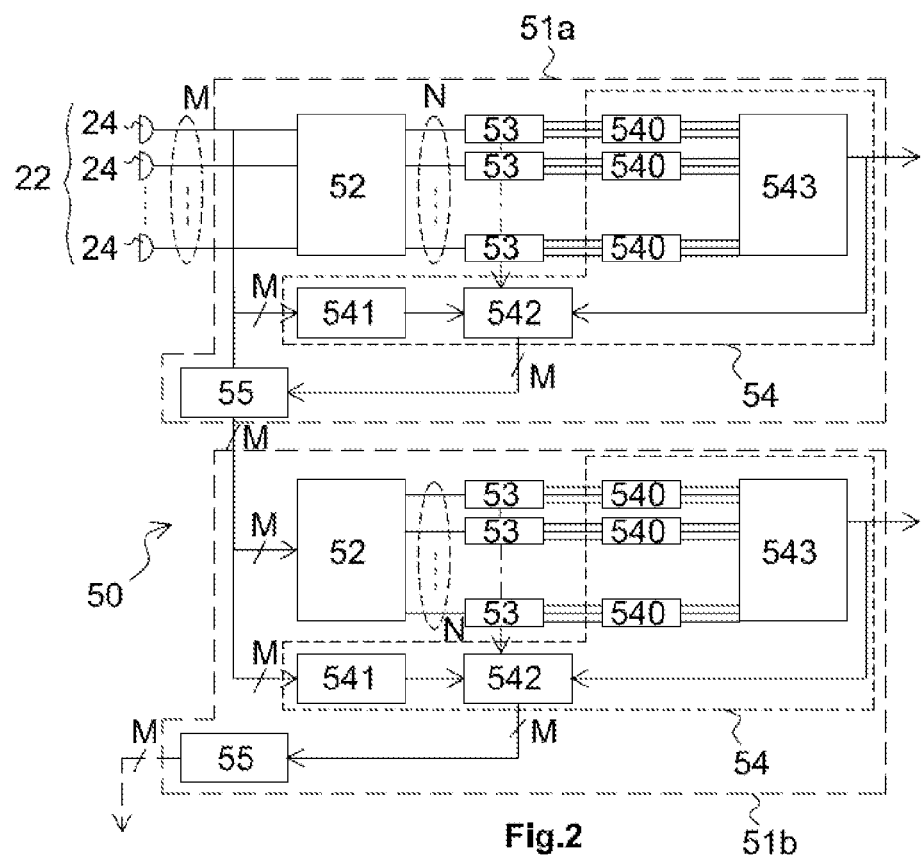
FIG. 2: a diagram illustrating an exemplary embodiment of a detection method.

FIG. 2 represents the main steps of a detection method 50 according to a particular embodiment.

As illustrated by FIG. 2, a detection method 50 according to the invention comprises at least two detection iterations: a first detection iteration 51a and a second detection iteration 51b.

The main steps of each of said first 51a and second 51b detection iterations are as follows:
  52 formation, from the individual signals obtained from the individual antennas 24 of the satellite 20, of virtual beams of different respective main directions of radiation,
  53 search for the presence of AIS signals in the virtual beams.

Thus, in its general principle, a detection method 50 is based on the formation of virtual beams.

A beam corresponds to a particular radiation pattern of the antenna array 22, and is formed conventionally by combining the individual signals by using a particular set of weighting coefficients. Thus, it is possible to form, from the individual signals, beams of different respective main directions of radiation by using different sets of weighting coefficients.

The expression "virtual beams" should be understood to mean that said beams are formed in a deferred manner (unlike a forming in real time). The individual signals are consequently first of all stored, and can then be used to form as many virtual beams as necessary.

In the particular embodiment illustrated by FIG. 2, the nonlimiting case is assumed in which one and the same number N of virtual beams are formed both during the first detection iteration 51a and during the second detection iteration 51b. Nothing precludes, according to other examples, from forming different numbers of virtual beams during the first 51a and second 51b detection iterations.

During the virtual beamforming step 52 of the first detection iteration 51a, the virtual beams are predefined virtual beams, of main directions of radiation that are evenly distributed in a radiofrequency field of view of the antenna array 22.

The expression "predefined virtual beams" should be understood to mean that the weighting coefficients considered for each virtual beam are static and known in advance. Such a forming of virtual beams is known in the literature as "conventional beamforming".

During the virtual beamforming step 52 of the second detection iteration 51b, the virtual beams can, according to the embodiment considered, be predefined virtual beams (conventional beamforming) and/or adaptive virtual beams.

The expression "adaptive virtual beams" should be understood to mean that the weighting coefficients considered for each virtual beam are dynamic and determined as a function of parameters that are not known in advance, for example as a function of the AIS signals detected during the first detection iteration 51a. Such virtual beamforming is known in the literature as "adaptive beamforming".

The step 53 of searching for AIS signals is executed for each of the N virtual beams formed during each of said first 51a and second 51b detection iterations. Said search for AIS signals can be performed conventionally.

Furthermore, for at least one AIS signal detected during the first detection iteration 51a, the respective contributions of said at least one detected AIS signal to the different individual signals are attenuated, relative to said first detection iteration, for all or part of the virtual beams formed during the second detection iteration 51b.

Preferentially, the respective contributions of a detected AIS signal to the different individual signals are attenuated in all the virtual beams formed during the second detection iteration 51b in one and/or the other of the following ways:
  by estimating and by suppressing said respective contributions in the different individual signals, the virtual beams being formed during the second detection iteration 51b from individual signals obtained after suppression, and/or
  by forming, during the second detection iteration 51b, adaptive virtual beams determined as a function of said detected AIS signal such that the respective contributions of said detected AIS signal are combined destructively in said adaptive virtual beams of the second detection iteration 51b.

In the particular embodiment illustrated by FIG. 2, the nonlimiting case is considered in which the respective contributions of at least one detected AIS signal to the M individual signals are estimated during a step 54, and suppressed in said individual signals during a step 55, before the formation of the virtual beams during the second detection iteration 51b.

Preferentially, such an estimation/suppression of the respective contributions of a detected AIS signal to the individual signals is performed for each detected AIS signal during the first iteration.

For example, the step 54 of estimating the respective contributions of a detected AIS signal comprises steps of:
- 540 estimating a demodulated signal from the AIS signal detected in a virtual beam,
- 541 estimating a direction of arrival and an amplitude of arrival, on the antenna array 22, of said detected AIS signal,
- 542 computing the M respective contributions of said detected AIS signal to the M individual signals, as a function of the demodulated signal, of the direction of arrival and of the amplitude of arrival of the detected AIS signal.

The estimated amplitude of arrival is preferably a complex amplitude, that is to say one that encompasses information on a phase of arrival, on the antenna array 22, of said detected AIS signal.

The step 540 of estimating the demodulated signal from the detected AIS signal can be performed conventionally, by demodulating said detected AIS signal according to the predefined modulation format of the binary data included in the AIS signals. The demodulated signal is then an estimation of the binary data included in said detected AIS signal. As is known, said binary data included in an AIS signal comprise, in principle, a Cyclic Redundancy Check (CRC) field making it possible to detect errors in the binary data received. Advantageously, the CRC is used to confirm that the detected signal is indeed an AIS signal, the detected signal being considered to be an AIS signal only if the decoding of the CRC indicates that there are no errors in the binary data received.

It should be noted that it is also possible, when an AIS signal has been detected in a virtual beam, to form, still during the first detection iteration 51a, a new virtual beam with a main direction of radiation identical to the direction of arrival of said detected AIS signal. Thus, the estimation of the demodulated signal will be improved because the antenna array 22 gain will be at maximum in said direction of arrival of said detected AIS signal.

The step 541 of estimating the direction of arrival and the amplitude of arrival of the detected AIS signal can implement methods considered to be within the scope of the man skilled in the art.

For example, the direction of arrival can be estimated by means of the MUSIC (Multiple Signal Classifier) algorithm or by means of the ESPRIT (Estimation of Signal Parameters via Rotational Invariant Techniques) algorithm, both based on the computation of a covariance matrix from the M individual signals.

In a preferred variant, the direction of arrival of the detected AIS signal on the antenna array 22 is estimated as a function of information, included in said detected AIS signal, on the position of the ship 40 having transmitted said detected AIS signal. In practice, it is known that an AIS signal includes the GPS coordinates of the ship that transmitted it, such that the direction of arrival of this AIS signal on the antenna array 22 of the satellite 20 can be estimated provided that the position and the attitude of the satellite 20 are also known.

For example, the amplitude of arrival of the detected AIS signal is estimated in the virtual beam formed during the first detection iteration 51a for which the main direction of radiation is closest to the estimated direction of arrival of said detected AIS signal. The amplitude of arrival of the detected AIS signal in the M individual signals can then be estimated from:
- the amplitude of arrival of said detected AIS signal in the virtual beam considered,
- the complex gain of the antenna array 22, for the virtual beam considered, in the direction of arrival of said detected AIS signal.

Then, the respective contributions of the detected AIS signal can be regenerated, during the step 542, from the demodulated signal, the direction of arrival and the amplitude of arrival of said detected AIS signal.

The M respective contributions of said detected AIS signal to the M individual signals are then known, and are subtracted from said individual signals during the suppression step 55.

By thus suppressing, in the individual signals, the contributions of all or part of the detected AIS signals, the detection of new AIS signals, previously masked by the detected AIS signals, will be facilitated during the second detection iteration 51b.

Preferably, and as illustrated by FIG. 2, the detection method 50 comprises, during the step 54 of searching for AIS signals in the virtual beams formed, a step 543 of determining whether one and the same AIS signal has been detected in several virtual beams. If one and the same AIS signal is detected in several virtual beams, the respective contributions of said detected AIS signal in several virtual beams are then regenerated and suppressed only once in the individual signals.

The determination whether one and the same AIS signal has been detected in several virtual beams can implement methods considered to be within the scope of a person skilled in the art. For example, it is possible to compare the demodulated signals obtained in different virtual beams. In practice, demodulated signals obtained in different virtual beams, if they correspond to one and the same AIS signal, should theoretically contain identical binary data.

In particular embodiments, the detection method 50 also comprises, for each detected AIS signal for which the respective contributions to the individual signals are to be estimated, the estimation of a frequency of arrival and/or of an instant of arrival of said detected AIS signal on the antenna array 22. The respective contributions of said detected AIS signal to the different individual signals are regenerated as a function also of said frequency of arrival and/or of said instant of arrival.

Such provisions make it possible to improve the accuracy of the regeneration of the contributions of the detected AIS signals, because said contributions will be realigned in frequency (by taking into account, inter alia, any frequency shifts induced by Doppler effect) and in time with all of the individual signals.

The estimation of the frequency of arrival and/or of the instant of arrival can implement frequency and/or time synchronization methods that are considered to be within the scope of the man skilled in the art, and is preferably performed in the virtual beam that led to the detection of the AIS signal considered. Such an estimation can be performed during the step 53 of searching for AIS signals and/or during the step 540 of estimating the demodulated signal.

In the particular embodiment illustrated by FIG. 2, the virtual beams, during the second detection iteration 51b, are formed from the M individual signals obtained after suppression of the respective contributions of AIS signals detected during the first detection iteration 51a.

In such a case, the virtual beams formed during the second detection iteration 51b can be predefined virtual beams (conventional beamforming) and/or adaptive virtual beams (adaptive beamforming).

In a preferred embodiment, the virtual beams formed during the second detection iteration 51b are predefined virtual beams of different main directions of radiation from the main directions of radiation of the virtual beams formed during the first detection iteration 51a.

For example, by considering a radiofrequency field of view of the antenna array 22 extending between −30° and 30°, and by considering a number N of virtual beams formed equal to six, it is possible to form:

- during the first detection iteration 51a: virtual beams of respective main directions of radiation −30°, −20°, −10°, 0°, 10° and 20°,
- during the second detection iteration 51b: virtual beams of respective main directions of radiation −25°, −15°, −5°, 5°, 15° and 25°.

As a variant or in addition, it is possible to form, during the second detection iteration 51b, adaptive virtual beams determined as a function of the AIS signals detected during the first detection iteration 51a.

According to a nonlimiting example, the adaptive virtual beams formed during the second detection iteration 51b are orthogonal to the respective directions of arrival of at least a part of the AIS signals detected during the first detection iteration.

The expression "orthogonal to the direction of arrival of an AIS signal" should be understood to mean that the radiation pattern of the antenna array 22 for the virtual beam considered exhibits, in said direction of arrival, a local minimum. Said local minimum is such that, in said direction of arrival, the virtual beam exhibit an antenna array 22 gain at least 20 decibels (dB) less than the antenna array 22 gain in the main direction of radiation of said virtual beam, even at least 30 dB less.

It should be noted that the number M of individual antennas 24 limits the number of directions of arrival to which a virtual beam can be orthogonal. In theory, it is possible to form (M−1) blind directions in a virtual beam, a blind direction being a direction in which no signal can be received (known as "null steering" in the literature). It will therefore be understood that it will not necessarily be possible to form a virtual beam orthogonal to the directions of arrival of all the detected AIS signals, if there are too many thereof.

In such a case, preference will be given to forming virtual beams orthogonal to the directions of arrival of the detected AIS signals for which the measured powers were the highest and/or of the AIS signals detected in several virtual beams of the first detection iteration 51a. In a variant, it is possible to form virtual beams orthogonal to the respective main directions of radiation of at least a part of the virtual beams in which several AIS signals have been detected during the first detection iteration 51a.

It should be noted that the detection method 50 can comprise more than two detection iterations. In the nonlimiting example illustrated by FIG. 2, the second detection iteration 51b then advantageously comprises, like the first detection iteration 51a, steps 54 of estimating and 55 of suppressing the contributions of the AIS signals detected during the second detection iteration 51b. The individual signals thus obtained are used for the forming of virtual beams during a third detection iteration, etc.

Hereinafter in the description, a particular embodiment of the antenna array 22 is considered, in which each individual antenna is designed to measure the signals received according to two distinct linear polarizations, preferably orthogonal. Thus, it is possible to form, from the individual signals, virtual beams of different respective main directions of radiation and/or of linear polarizations by using different sets of weighting coefficients.

In such a case, virtual beams of different respective linear polarizations are preferably formed during the first detection iteration 51a and/or during the second detection iteration 51b, for example evenly distributed in a radiofrequency field of view of the antenna array 22.

The AIS signals are transmitted with a vertical linear polarization. When propagating, an AIS signal will retain a substantially linear polarization, but the latter will turn. Consequently, the AIS signals are all received with a substantially linear polarization, but with an orientation that will be able to vary from one received AIS signal to another. By forming virtual beams of different linear polarizations, it will consequently be possible to distinguish AIS signals received with different linear polarizations.

In a preferred embodiment, different linear polarizations are considered from one detection iteration to a next detection iteration.

For example, the virtual beams formed during the second detection iteration 51b are predefined virtual beams of different linear polarizations from the linear polarizations of the virtual beams formed during the first detection iteration 51a.

As a variant or in addition, when adaptive virtual beams are formed during the second detection iteration 51b, the latter are, for example, orthogonal to the respective linear polarizations of arrival of at least a part of the AIS signals detected during the first detection iteration.

The expression "orthogonal to the linear polarization of arrival of an AIS signal" should be understood to mean that the linear polarization of the virtual beam considered is orthogonal to the linear polarization of arrival of said AIS signal.

If the number of AIS signals detected is too great, it will be possible to form virtual beams orthogonal to the linear polarizations of arrival of the detected AIS signals for which the measured powers were highest and/or orthogonal to the linear polarizations of arrival of the AIS signals detected in several virtual beams of the first detection iteration 51a. In a variant, it is possible to form virtual beams orthogonal to the respective linear polarizations of at least a part of the virtual beams in which several AIS signals have been detected during the first detection iteration 51a.

In the case illustrated by FIG. 2 where the respective contributions of at least one detected AIS signal to the M individual signals are estimated during a step 54, and suppressed in said individual signals during a step 55, the M respective contributions of said detected AIS signal to the M individual signals are preferably also computed as a function of the linear polarization of arrival of said detected AIS signal, for example estimated during the estimation step 541.

Figure 3:
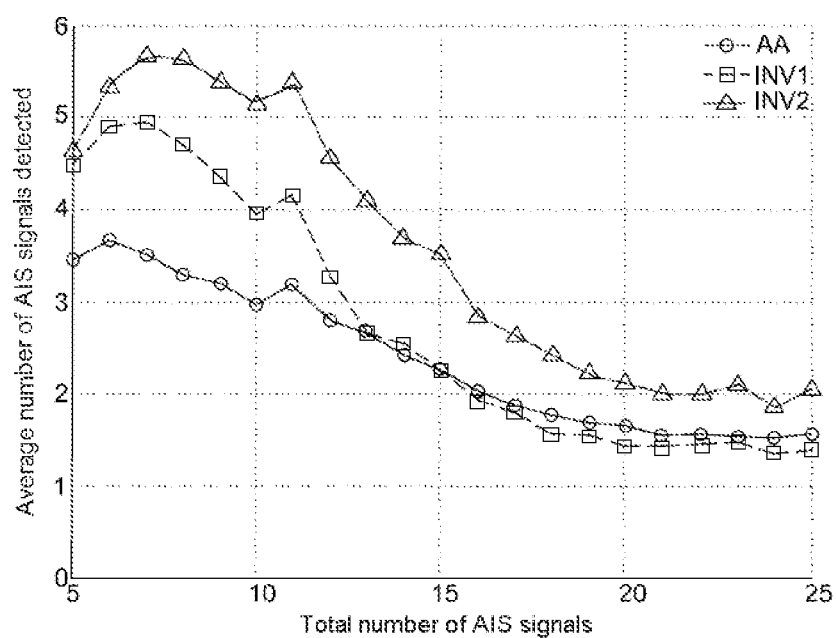
FIG. 3: curves illustrating the efficiency of the broadcast signal detection.

FIG. 3 represents curves, obtained by simulation, illustrating AIS signal detection efficiency of several detection methods. More particularly, FIG. 3 represents the average number of AIS signals detected as a function of the total number of AIS signals present in individual signals, in the case of an antenna array 22 comprising five individual antennas 24 spaced apart by one wavelength, each of said individual antennas 24 having double linear polarization (horizontal and vertical).

Three curves are represented, illustrating the results obtained for three different detection methods: one detection method according to the prior art and two detection methods according to the invention.

For comparison purposes, the same total number of virtual beams formed was considered for the three detection methods, in order to obtain a substantially equivalent computation complexity. In the case in point, a total of 72 virtual beams were formed to obtain each of the curves represented in FIG. 3.

In the detection method according to the prior art, twelve main directions of radiation were considered (from −30° to 25° in 5° steps) and, for each main direction of radiation, six different linear polarizations (from 0° to 150° in 30° steps) were also considered. The results obtained correspond to the curve designated "AA" in FIG. 3.

The detection methods 50 according to the invention, considered to obtain the results represented in FIG. 3, both comprise four detection iterations and are both based on the estimation/suppression of the AIS signals detected in the individual signals, the individual signals obtained after suppression being considered for the forming of virtual beams during the next detection iteration.

In the first detection method 50 according to the invention considered (for which the results obtained correspond to the curve designated "INV1"), the same virtual beams are formed during the four detection iterations. More particularly, six main directions of radiation (from −30° to 20° in 10° steps) and, for each main direction of radiation, three different linear polarizations (0°, 60°, 120°) were considered.

In the second detection method 50 according to the invention considered (for which the results obtained correspond to the curve designated "INV2"), different virtual beams are formed during the four detection iterations. For each detection iteration, six main directions of radiation were considered and, for each main direction of radiation, three different linear polarizations were considered. More particularly, the following were considered:

during the first detection iteration: the main directions of radiation from −30° to 20° in 10° steps and, for each main direction of radiation, the linear polarizations 0°, 60° and 120°, during the second detection iteration: the main directions of radiation from −25° to 25° in 10° steps and, for each main direction of radiation, the linear polarizations 0°, 60° and 120°, during the third detection iteration: the main directions of radiation from −30° to 20° in 10° steps and, for each main direction of radiation, the linear polarizations 30°, 90° and 150°, during the fourth detection iteration: the main directions of radiation from −25° to 25° in 10° steps and, for each main direction of radiation, the linear polarizations 30°, 90° and 150°.

As illustrated by FIG. 3, when the total number of AIS signals present in the individual signals is between 5 and 10, the number of AIS signals detected by implementing the first and second detection methods 50 according to the invention is very much greater than the number of AIS signals detected by implementing the detection method according to the prior art (an improvement of around 60%).

FIG. 3 also illustrates the benefit of forming different virtual beams from one detection iteration to a next detection iteration. Indeed the number of AIS signals detected by implementing the second detection method 50 according to the invention is always greater than the number of AIS signals detected by implementing the first detection method 50 according to the invention (an improvement of around 20% when the total number of AIS signals present in the individual signals is between 5 and 10).

More generally, it should be noted that the implementations and embodiments considered above have been described as nonlimiting examples, and that other variants can consequently be envisaged.

In particular, the invention has been described by considering that the processing device 30 was on the ground. Nothing precludes, according to other examples, from directly embedding said processing device 30 in the satellite 20, that is to say that the satellite 20 implements the various steps of a detection method 50 according to the invention. In such a case, the satellite 20 transmits to a ground station the detected AIS signals and/or information extracted from said detected AIS signals.

The invention claimed is:

1. A method for detecting broadcast signals, transmitted by terrestrial sources and received by a satellite, in individual signals respectively from different individual antennas of an antenna array of the satellite, wherein:

said method comprises a first detection iteration and a second detection iteration, each of said first and second detection iterations comprising a step of forming, from the individual signals, virtual beams of different respective main radiation directions, and a step of searching for the presence of broadcast signals in the virtual beams, for at least one broadcast signal detected during the first detection iteration, the respective contributions of said at least one detected broadcast signal to the different individual signals are attenuated, relative to said first detection iteration, for all or part of the virtual beams formed during the second detection iteration.

2. The method as claimed in claim 1, wherein the first detection iteration comprises, for each broadcast signal detected in the virtual beams, steps of:

estimating the respective contributions of said detected broadcast signal to the different individual signals, suppressing the respective contributions of said detected broadcast signal in the different individual signals, and wherein, during the second detection iteration, at least one virtual beam is formed from the individual signals obtained after suppression of the contributions of the broadcast signals detected during the first detection iteration.

3. The method as claimed in claim 2, wherein the step of estimating the respective contributions of a detected broadcast signal to the different individual signals comprises steps of:

estimating a demodulated signal from said detected broadcast signal, estimating a direction of arrival and an amplitude of arrival, on the antenna array, of said detected broadcast signal, computing the respective contributions of said detected broadcast signal to the different individual signals, as a function of the demodulated signal, of the direction of arrival and of the amplitude of arrival of said detected broadcast signal.

4. The method as claimed in claim 3, comprising, for each detected broadcast signal, the estimation also of the linear polarization of arrival of said detected broadcast signal on the antenna array, the respective contributions of said detected broadcast signal to the different individual signals being also computed as a function of said linear polarization of arrival.

5. The method as claimed in claim 3, wherein, when a broadcast signal has been detected, a virtual beam is formed in the direction of arrival and/or the linear polarization of arrival of said detected broadcast signal to estimate the demodulated signal.

6. The method as claimed in claim 3, comprising, for each detected broadcast signal, the estimation also of a frequency of arrival and/or of an instant of arrival of said detected broadcast signal on the antenna array, the respective contributions of said detected broadcast signal to the different individual signals being also computed as a function of the frequency of arrival and/or of the instant of arrival.

7. The method as claimed in claim 1, wherein, during the second detection iteration, the virtual beams formed are predefined virtual beams of main radiation directions and/or of linear polarizations different from the main radiation directions and/or linear polarizations of the virtual beams formed during the first detection iteration.

8. The method as claimed in claim 1, wherein the virtual beams formed during the second detection iteration are adaptive virtual beams determined as a function of the broadcast signals detected during the first detection iteration.

9. The method as claimed in claim 8, wherein the adaptive virtual beams formed during the second detection iteration are orthogonal to the respective main radiation directions and/or to the respective linear polarizations of at least a part of the virtual beams, formed during the first detection iteration, in which broadcast signals have been detected.

10. The method as claimed in claim 8, wherein the first detection iteration comprises, for each broadcast signal detected in the virtual beams, a step of estimating a direction of arrival and/or of a linear polarization of arrival, on the antenna array, of said detected broadcast signal, and wherein the adaptive virtual beams formed during the section detection iteration are orthogonal to the respective directions of arrival and/or orthogonal to the respective linear polarizations of arrival of at least a part of the broadcast signals detected during the first detection iteration.

11. The method as claimed in claim 1, wherein the broadcast signals are AIS signals transmitted by ships and/or ADS-B signals transmitted by aircraft.

12. The method as claimed in claim 11, wherein the direction of arrival of a detected broadcast signal is estimated as a function of information, included in said broadcast signal, relating to the position of the terrestrial source having transmitted said detected broadcast signal.

13. A processor and an electronic memory comprising a stored set of program code instructions which, when the program code instructions are executed by the processor, implement a detection method for detecting broadcast signals, transmitted by terrestrial sources and received by a satellite, in individual signals respectively from different individual antennas of an antenna array of the satellite, said method comprising i) a first detection iteration and a second detection iteration, each of said first and second detection iterations comprising a step of forming, from the individual signals, virtual beams of different respective main radiation directions, and a step of searching for the presence of broadcast signals in the virtual beams, and ii) for at least one broadcast signal detected during the first detection iteration, the respective contributions of said at least one detected broadcast signal to the different individual signals are attenuated, relative to said first detection iteration, for all or part of the virtual beams formed during the second detection iteration.

14. A processing device comprising means configured to detect broadcast signals in individual signals, obtained respectively from different individual antennas of an antenna array of a satellite, in accordance with a method as claimed in claim 1.

15. A system for detecting broadcast signals transmitted by terrestrial sources, comprising at least one satellite in earth orbit and at least one terrestrial processing device as claimed in claim 14, said satellite comprising:
- an antenna array comprising a plurality of individual antennas,
- means adapted to transmit all or part of the individual signals, obtained respectively from the different individual antennas, to the processing device,
- the processing device comprising means adapted to receive said individual signals transmitted by the satellite.

* * * * *